United States Patent [19]

Ragas et al.

[11] 4,450,203

[45] * May 22, 1984

[54] ELECTROGRAPHIC COATINGS CONTAINING ACRYLAMIDE COPOLYMERS

[75] Inventors: Frank J. Ragas, Willow Springs; Ralph L. Minnis, Des Plaines; Gerson E. Beauchamp, Park Ridge, all of Ill.

[73] Assignee: DeSoto, Inc., Des Plaines, Ill.

[ * ] Notice: The portion of the term of this patent subsequent to Jul. 13, 1999 has been disclaimed.

[21] Appl. No.: 432,683

[22] Filed: Oct. 4, 1982

[51] Int. Cl.[3] ........................ B32B 23/08; B32B 27/10; B05D 5/12

[52] U.S. Cl. .................................... 428/514; 162/138; 427/121; 428/511; 524/425; 524/555

[58] Field of Search ................ 428/514, 511; 427/121; 162/138; 524/425, 555

[56] References Cited

U.S. PATENT DOCUMENTS 4,339,505 7/1982 Ragas et al. ......................... 428/514

*Primary Examiner*—Thomas J. Herbert, Jr.

*Attorney, Agent, or Firm*—Dressler, Goldsmith, Shore, Sutker & Milnamow, Ltd.

[57] ABSTRACT

Electrically conductive paper is coated with an insulating coating comprising an organic solvent-soluble solution copolymer of monoethylenically unsaturated monomers comprising from about 1% to about 8% of copolymerized acrylamide or a monoethylenic derivative thereof in combination with from 4% to 10% of copolymerized monoethylenically unsaturated carboxylic acid including from ¼th to ¾ths of methacrylic acid based on total carboxylic acid monomer.

9 Claims, No Drawings

ELECTROGRAPHIC COATINGS CONTAINING ACRYLAMIDE COPOLYMERS

Technical Field

This invention relates to insulating coatings which are applied to conductive substrates to accept and hold an electrostatic charge as part of an electrostatic reprographic system.

Background Art

The application of insulating coatings to conductive substrates to produce coated sheets useful in electrographic printing processes is known, and we have previously found that electrically conductive paper coated with an insulating coating comprising a solvent-soluble copolymer of monoethylenically unsaturated monomers comprising from 5% to 40% of copolymerized acrylamide or a monoethylenical derivative thereof is particularly useful to enable the acceptance of a high level of charge without picking up a detrimental background charge. This is disclosed in our prior U.S. Pat. No. 4,339,505 issued July 13, 1982. In that patent we apply the coating from organic solvent solution and we point out that up to about 3% of a monoethylenically unsaturated carboxylic acid, such as acrylic or methacrylic acid, might optionally be included in the copolymer.

In practicing the disclosure of said patent, we find that 10% or more of the acrylamide component must be present in the copolymer because charge acceptance and print density fall off when smaller amounts are used.

Disclosure of Invention

We have now found that the electrographic systems of our prior patent can be improved to provide better charge acceptance and print density by using larger proportions of monoethylenically unsaturated carboxylic acid together with generally smaller amounts of acrylamide or a derivative thereof. Moreover, we find that we can do this in organic solvent solution systems by using a mixture of carboxylic acids including a proportion of methacrylic acid. When larger amounts of carboxylic acid are used without methacrylic acid, then the copolymer solution viscosity is undesirably high and this forces one to use lower solids content solutions which excessively penetrate the conductive paper. On the other hand, the charge acceptance and print density are inadequate when methacrylic acid is used alone.

Also, and by using t-octylacrylamide, we have been able to maximize the resin solids content of the pigmented coatings without detrimentally increasing the coating viscosity, and this minimizes the tendency of the solvent solution coatings to penetrate the conductive paper which is coated.

More particularly, in accordance with this invention, electrically conductive paper is coated with an insulating coating comprising an organic solvent-soluble solution copolymer of monoethylenically unsaturated monomers comprising from about 1% to about 8%, preferably not in excess of 6%, of copolymerized acrylamide (a term which includes methacrylamide) or a monoethylenically unsaturated derivative thereof, and from 4% to 10% of monoethylenically unsaturated carboxylic acid including from ¼th to ¾ths of methacrylic acid based on total carboxylic acid monomer.

In preferred practice an alkyl acrylamide or methacrylamide is used in which the alkyl group contains from 4–12 carbon atoms, and especially t-octyl acrylamide in an amount of from 1% to 4%.

It will be understood that all proportions and ratios herein are by weight, unless otherwise specified.

The polymer used to provide the binder portion of the insulating coating is an organic solvent-soluble, nongelled polymer which is formed by copolymerization in organic solvent solution and applied to the conductive paper in organic solvent solution. In this invention the larger proportion of carboxylic acid allows the acrylamide component to be used in smaller amount to provide electrographic coating systems which possess a clean sheet background in combination with higher charge acceptance, greater print density, and also the ability to use a higher ratio of pigment to binder which provides a desirable economy. At the same time, the presence of the methacrylic acid component avoids excessive solution viscosity so that the invention obtains increased solids content at lower coating viscosity. This reduces the penetration of the conductive paper substrate which helps to provide the superior electrical characteristics which have been discussed.

It is particularly preferred to employ copolymers entirely constituted by copolymerized monoethylenic monomers. The selection of monomers, except as noted hereinbefore, is much the same as set forth in our said U.S. Pat. No. 4,339,505. More particularly, the preferred monomers are styrene and $C_1$–$C_8$ alkanol esters of acrylic and methacrylic acids. Methyl methacrylate is particularly preferred to constitute at least about 30% of the copolymer. N-butyl and isobutyl acrylate and methacrylate are also useful. Vinyl toluene and vinyl acetate will further illustrate useful monomers. While hydroxy functional monomers may be present, such as 2-hydroxyethyl acrylate or methacrylate, this is not essential.

Calcium carbonate pigmentation is preferred, and this may be carried out by grinding the pigment into the solvent solution of the copolymer.

Other alkyl acrylamides which may be used are illustrated by t-butyl acrylamide and dodecyl methacrylamide. Other carboxylic acids which may be used are illustrated by crotonic acid, fumaric acid and monobutyl maleate.

Example 1

Charge to a 3 liter, 4-necked flask, 260 grams of toluene and 170 grams of isopropyl alcohol and heat to 85° C. Separately prepare a monomer mixture of 495 grams of methyl methacrylate, 375 grams of n-butyl acrylate, 50 grams of acrylamide, 200 grams of isopropyl alcohol, 40 grams of acrylic acid and 40 grams of methacrylic acid. 22% of this monomer mixture is mixed with 6 grams of azobisisobutyronitrile catalyst, and the mixture is slowly added to the hot contents of the flask. This causes copolymerization to begin. The balance of the monomer mixture is then placed in one addition funnel and a catalyst mixture containing 8 grams of azobisisobutyronitrile together with 10 grams of benzoyl peroxide in 160 grams of toluene is placed in a second addition funnel and the two solutions are added slowly over a period of 3 hours. After addition is complete, the reaction mixture is held for 5 hours at which time conversion of monomer to polymer was substantially 100% complete. 31 grams of toluene was then added to provide a final solution having a resin solids content of about 55%.

By pigmenting the copolymer solution with calcium carbonate to a pigment to binder ratio high enough such that 70% of the composition was pigment provides a coating viscosity of 840 centipoises. With more pigment providing 75% pigment, the coating viscosity was 2,700 centipoises. In both instances, coatings on electroconductive paper provides electrographic papers which accept a higher than normal charge without excessive background.

Example 2

Example 1 is repeated except that the initial solvent charge to the flask contained 190 grams of toluene together with 210 grams of isopropyl alcohol. The monomer mixture is prepared to contain 535 grams of methyl methacrylate, 365 grams of n-butyl acrylate, 20 grams of t-octylacrylamide, 87 grams of isopropyl acrylate, 40 grams of acrylic acid and 40 grams of methacrylic acid. As in Example 1, 22% of the monomer mixture together with 6 grams of the same catalyst are used to begin the polymerization and the balance of the monomer mixture is added in one addition funnel at the same time that a mixture of the same catalysts in 150 grams of toluene are added in a second addition funnel. Once again, the monomers and separately added catalyst are added over a period of 3 hours and the reaction mixture was held for 5 hours at the reaction temperature of 85° C. to complete the reaction. This time, 31 grams of toluene were added to provide a final solids content of about 60%.

Pigmentation with calcium carbonate to a pigment content of 70% of the total composition provided a viscosity of 220 centipoises and pigmentation to 75% provided a viscosity of 1,520 centipoises.

As can be seen, the coating compositions of this example contain more resin at lower viscosity and use about 5% less organic solvent. They deposit excellent electrographic coatings on electroconductive paper, as in Example 1.

What is claimed is:

1. Electrically conductive paper coated with an insulating coating comprising an organic solvent-soluble solution copolymer of monoethylenically unsaturated monomers comprising from about 1% to about 8% of copolymerized acrylamide or a monoethylenic derivative thereof in combination with from 4% to 10% of copolymerized monoethylenically unsaturated carboxylic acid including from $\frac{1}{4}$th to $\frac{3}{4}$ths of methacrylic acid based on total carboxylic acid monomer.

2. Conductive paper as recited in claim 1 in which said copolymer comprises acrylic acid and methacrylic acid in combination with not in excess of 6% of said copolymerized acrylamide or monoethylenic derivative thereof.

3. Conductive paper as recited in claim 1 in which said copolymer consists of copolymerized monoethylenically unsaturated monomers.

4. Conductive paper as recited in claim 1 in which said insulating coating is pigmented.

5. Conductive paper as recited in claim 4 in which said pigment is calcium carbonate.

6. Conductive paper as recited in claim 5 in which said pigment is present in a pigment to binder ratio of from 2:1 to 6:1.

7. Conductive paper as recited in claim 1 in which said copolymer comprises from 1% to 4% of t-octyl acrylamide.

8. Conductive paper as recited in claim 7 in which said copolymer contains copolymerized $C_1$–$C_8$ alkanol esters of acrylic and methacrylic acids.

9. Conductive paper as recited in claim 8 in which said copolymer contains at least about 30% of copolymerized methyl methacrylate.

* * * * *